March 10, 1942.   A. MAISTO   2,275,536
HOT VEGETABLE HOLDER
Filed July 7, 1939

INVENTOR.
Anthony Maisto,
BY
Harold D. Penny ATTORNEYS.

Patented Mar. 10, 1942

2,275,536

UNITED STATES PATENT OFFICE 2,275,536

HOT VEGETABLE HOLDER

Anthony Maisto, Brooklyn, N. Y.

Application July 7, 1939, Serial No. 283,168

4 Claims. (Cl. 294—5)

The present invention relates to an improvement in holders for use in handling hot corn on the cob and other vegetables or articles, and to methods for making such holder.

Devices of this nature are usually made of metal; and if the corn on the cob is hot, as it usually is, the heat is rapidly transmitted to the holders, and at times heats the holders so hot that they cannot be held in the fingers, and thus the function of the holder is defeated.

The present improvement has for its principal advantage the provision of means on such a holder whereby the heat may be dissipated before it reaches the handle portions thereof, and comprises heat radiating or dissipating means between the cob engaging prong and the handle means, thereby to prevent said handle means from becoming too hot to hold.

Another object of the invention is to provide an improved method for casting my improved holder.

The foregoing and other features and objects will be apprehended as the herein description proceeds, and it will be obvious that modifications may be made in the structure herein disclosed without departing from the spirit hereof or the scope of the appended claims.

The holder, the handle of which is denoted by H, and the prong thereof, denoted by 1, is preferably made of cast metal, such as pewter or a lead alloy and may be polished and plated as desired. The handle and prong are connected by a stem 7 provided with radiating webs 3. The handle and stem are preferably hollow.

Figure 1:
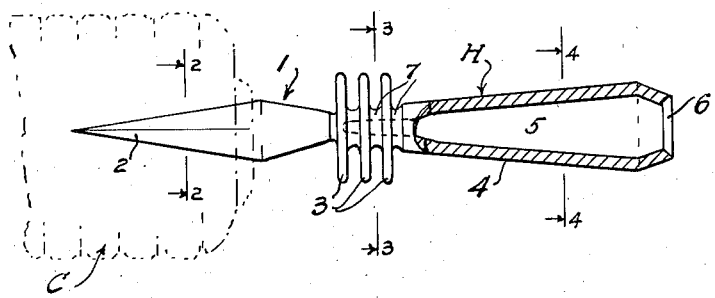
Fig. 1 is a side view of one of the holders, partially in section.
Figure 2:
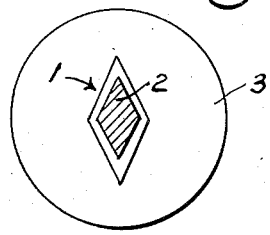
Fig. 2 is a section taken on line 2—2, Fig. 1, looking in the direction of the arrows.
Figure 3:
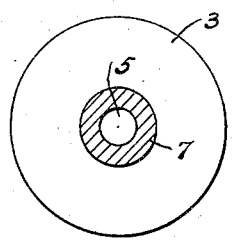
Fig. 3 is a section taken on the line 3—3, Fig. 1, looking in the direction of the arrows.

The prong 1, as may be seen in Fig. 2, is preferably pointed and of diamond shape, in cross section, this form enabling the user to easily engage the point 2 into the cob C, shown dotted in Fig. 1. Two of these holders are customarily used, one on each end of the cob, but only one is here shown, it being understood that the other may be used.

Figure 4:
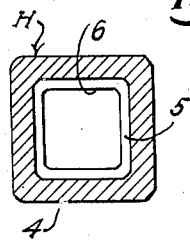
Fig. 4 is a section taken on the line 4—4, Fig. 1, looking in the direction of the arrows.

The handle H may be of polygonal cross section, in the present instance shown square in cross section, as in Fig. 4.

The handle wall 4, Fig. 1, may be comparatively thin, leaving the center thereof with a hollow chamber 5 extending into the stem, the rear end of the handle having an open end 6, Fig. 1, the hollow providing an inner radiating face.

Between the handle H and the prong end 1 the stem 3 is provided with a plurality of relatively thin heat radiating webs 3, preferably of circular form, said webs being preferably integral with the holder, thereby to efficiently radiate heat to atmosphere, from the cob, as it passes from the cob through the prong and stem to the holder. These radiating webs intercept and disperse a volume of heat from the cob sufficient to keep the handles H of the holders from becoming too hot to hold in the fingers.

In the manufacture of the holder, the mould may be made of a metal of higher melting point than the metal from which the holder is made, and after the melted holder metal is poured into the mould, the mould being provided with a pouring aperture at the handle end, the mould is turned upside down and the unchilled and still moulten center core of the handle and stem is poured out, leaving the already chilled metal in place as the prong and outer wall of the handle and stem.

Having thus described the invention what is claimed is:

1. A metal holder comprising a prong of angular cross-section; a hollow handle alined with the prong and open at the end remote from the prong and of small cross-section at the end nearer the prong; a hollow stem alined with and connecting the prong and handle and having its hollow communicating with the hollow of the handle; said stem comprising narrow portions of small diameter, and intervening spaced disklike radiating webs of large diameter having large radiating faces adapted to receive and radiate heat transmitted from the prong.

2. A one-piece holder of cast metal of medium low melting point such as pewter or the like for use in handling and eating corn or other hot articles, said holder comprising a prong of long taper and diamond shaped cross-section adapted to be forced into the article and hold the same non-rotative thereon and to receive heat from the article; a thin hollow handle of angular cross-section alined with the prong and of large diameter and open at the end remote from the prong and of smaller cross-section at the end nearer the prong; a partly hollow stem alined with and connecting the prong and handle and having its hollow communicating with the interior of the handle, the outer and inner faces of the hollow handle and stem serving to radiate heat; said stem comprising narrow portions of small diameter adapted to limit the passage of heat from the prong toward the handle, and intervening disklike radiating webs coaxial with the prong and handle and of larger diameter than either, each web having large radiating faces adapted to receive and radiate heat from the small amount transmitted by the narrow portions from the prong, whereby each narrow portion more remote from the prong receives progressively less heat to be radiated and a relatively small amount of heat reaches the handle; said faces being large enough to radiate enough heat to keep the handle comfortably cool when the prong is imbedded in very hot articles.

3. A holder as in claim 1, the hollow of the stem being nearly half as large in diameter as the stem, and extending from the hollow of the handle as far as the web nearest the prong, thereby to greatly reduce the cross-section of the stem at the webs, to allow the conduction of only a small amount of heat; each web having a large radiating face adapted to receive and radiate heat from the small amount transmitted from the prong by the narrow portions of reduced cross-section, whereby each narrow portion more remote from the prong receives progressively less heat to be radiated and a relatively small amount of heat reaches the handle.

4. A holder as in claim 1, the handle being laterally imperforate, whereby heat from the interior of the stem and handle is prevented from passing to the fingers pressed upon the handle, but is conducted out at the end of the handle away from the fingers.

ANTHONY MAISTO.